Oct. 7, 1924.
M. F. STEIN
FEED REGULATOR
Filed July 9, 1921
1,510,907
3 Sheets-Sheet 1
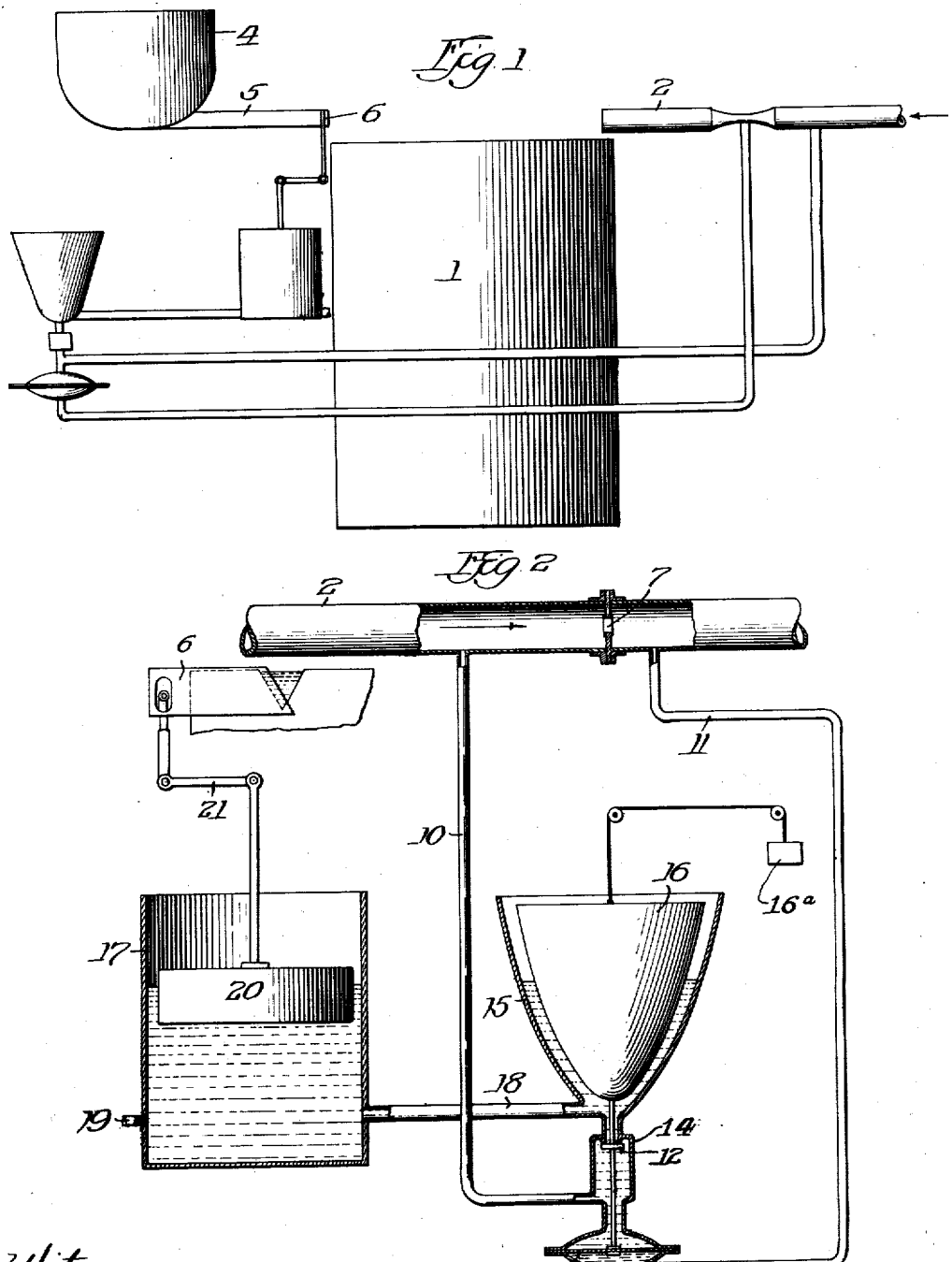

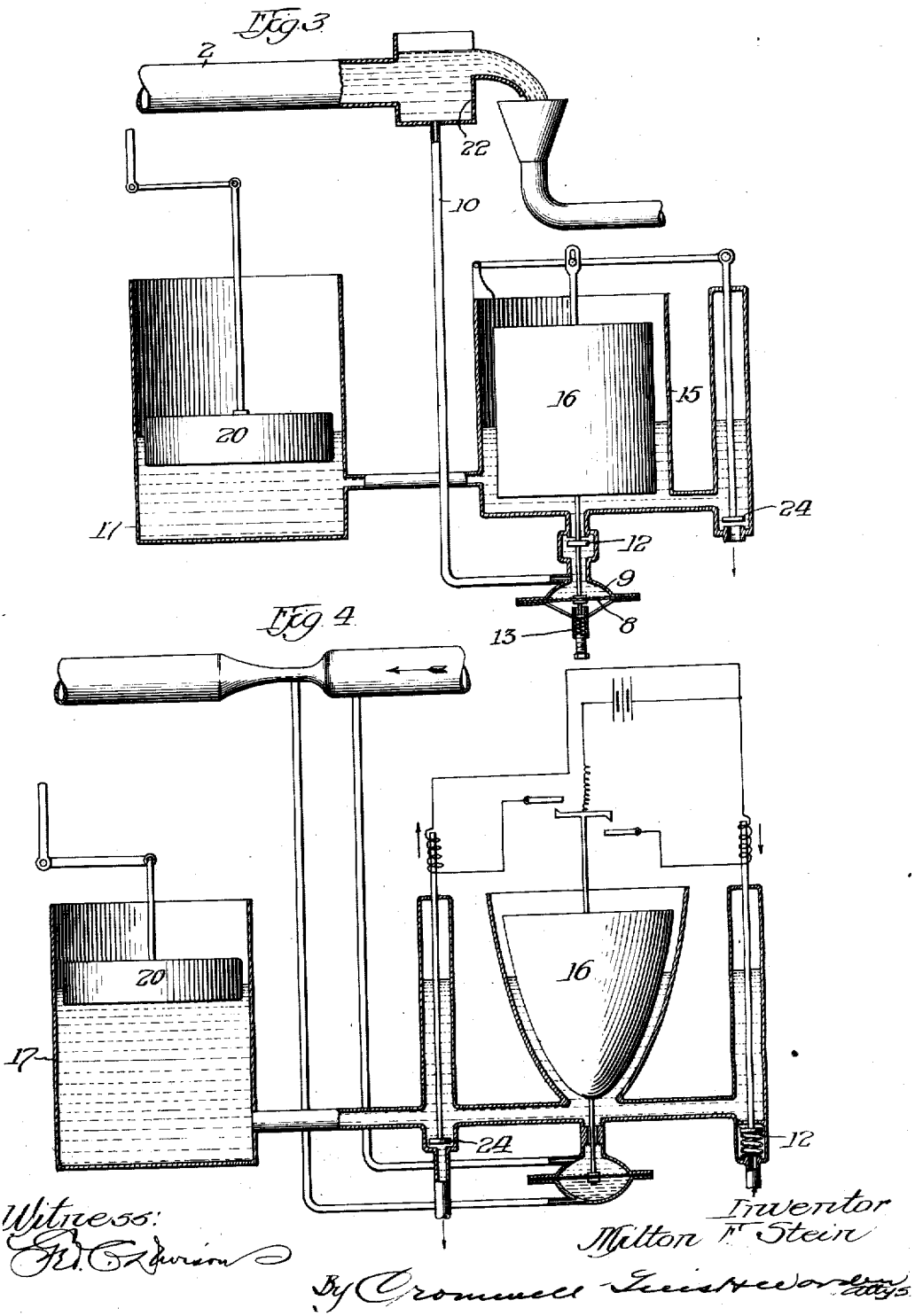

Oct. 7, 1924.

M. F. STEIN 1,510,907

FEED REGULATOR

Filed July 9, 1921   3 Sheets-Sheet 3

Witness:
Geo. C. Davison

Inventor:
Milton F. Stein,
By Cromwell Greist
   Attys

Patented Oct. 7, 1924.

1,510,907

UNITED STATES PATENT OFFICE.

MILTON F. STEIN, OF CHICAGO, ILLINOIS, ASSIGNOR TO INTERNATIONAL FILTER CO., OF CHICAGO, ILLINOIS, A CORPORATION OF ILLINOIS.

FEED REGULATOR.

Application filed July 9, 1921. Serial No. 483,643.

*To all whom it may concern:*

Be it known that I, MILTON F. STEIN, a citizen of the United States, residing at Chicago, in the county of Cook and State of Illinois, have invented certain new and useful Improvements in Feed Regulators, of which the following is a specification.

This invention relates to automatic apparatus for controlling the feed of material to a fluid incident to the feed of the latter, and in a desired constant or varying proportion thereto. The invention pertains also to particular improvements in means for accomplishing automatic regulating operations, for which purpose it is adapted for employment in various particular uses in which it is desired to secure a result bearing a predetermined relation to a quantity of liquid flow which is subject to variation.

A general purpose of the invention is the provision of apparatus which may be utilized to accomplish a regulating operation which is always proportionate to, or some desired function of, the quantity of a liquid flowing in a conduit.

The principal object of the invention is the provision of apparatus of the sort specified which in its regulating operation will conform closely with changes in the flow or rate of supply of the fluid, and which will maintain the regulated operation in close conformity with the conditions which it is intended to meet, without "hunting" or vacillating effects incident to readjustment of the regulated operation in response to variations in the controlling conditions.

A particular object of the invention is the provision of an improved form of apparatus effective to create a hydrostatic level which is always directly proportional to, or some function of, the quantity of fluid flowing in a conduit, and to effect operation of regulating means by such hydrostatic level directly.

Another object of the invention is the provision of apparatus for obtaining such an effect and which is sensitively responsive to slight variations in the quantity of flow.

Another object of the invention is the provision of such apparatus which is adapted for installation and effective operation at a considerable distance from the conduit in which the measured liquid flows.

A further object of the invention is the provision of apparatus of the sort specified in which the operating parts or elements of the regulating mechanism are not subject to contact with or influence of the material under regulation, thus saving the apparatus from any injurious effects from such material, and permitting the use of the apparatus with various chemicals which might have injurious or incapacitating effect upon mechanisms.

Other and further objects of the invention will be pointed out hereinafter, indicated in the appended claims or obvious upon an understanding of the present disclosure.

For the purpose of the present application I show the invention embodied in certain forms as applied to the regulation of apparatus for feeding treating material to the measured liquid, but it is to be understood that such disclosure is made for the purpose of illustration only, and that the invention is not limited to such use or to the particular forms or embodiments described herein and illustrated in the accompanying drawings forming a part of this specification.

In the drawings—

Fig. 1 is a diagrammatical elevation of apparatus applicable to the treatment of water or other liquid for obtaining softening or other effects;

Fig. 2 is a diagrammatical illustration in the nature of a vertical section of apparatus embodying the invention; and Figs. 3, 4 and 5 are diagrammatical illustrations in the nature of sectional elevations of other forms in which the invention may be embodied and utilized.

Figure 5:
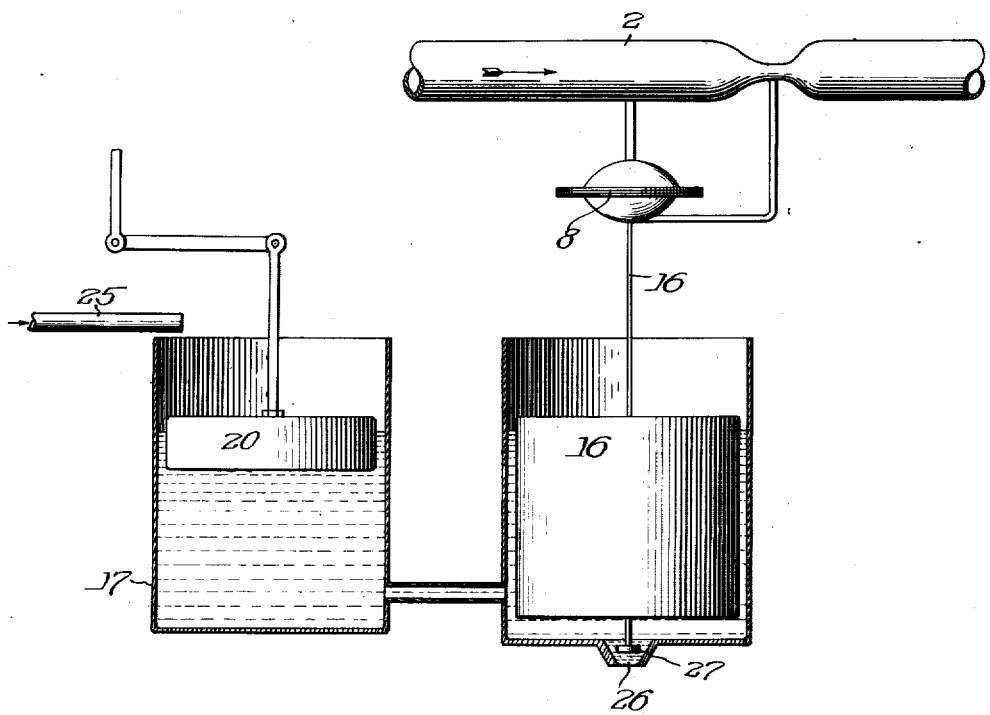

Described generally, the invention contemplates the provision of a conduit adapted to accommodate the flow of a liquid, which conduit is provided with an orifice, weir or other constricted flow aperture arranged for the passage of fluid therethrough, the relationship of which flow aperture to the conduit creates in the latter a hydrostatic pressure which is a function of the quantity of the flow, or differentiated hydrostatic pressures whose difference is a function of the quantity of the flow. Associated with these elements in such fashion as to be operably influenced by the hydrostatic pressure or pressures thus produced, is a pressure responsive device upon which said pressures are impressed. This pressure responsive device is one element of a control means which regulates the admission of liquid to a suitable receptacle, in which receptacle is disposed the other element of the controlling means, which second element is an equalizing element. This equalizing element is operatively responsive in a predetermined relationship to variations in the level of liquid contained in the receptacle, so that, upon that liquid attaining a predetermined level, the effectiveness of the pressure responsive device to permit further introduction of liquid into the receptacle is overcome, and further increase in the quantity of liquid in the receptacle momentarily prevented. The level of the liquid in the regulating receptacle establishes the level of liquid in an associated or work receptacle, which latter level determines the degree of effectiveness of the regulated mechanism.

The invention may be further understood by references to the illustrative embodiments shown in the drawings, in which like reference characters are applied to the designation of like parts throughout. In Fig. 1 the numeral 1 designates a treating tank into which water may be fed continuously from an inlet conduit 2, the flow in said conduit being subject to variation. The numeral 4 designates a chemical tank in which materials appropriate to the treatment of the water may be prepared or deposited for use, and from which such materials are fed through a conduit 5 to the treating tank 1. The discharge of this treating material into the treating tank is controlled by a measuring device 6, the effectiveness of which is governed by regulating apparatus in which the present invention is contained. A form of this regulating device is illustrated in Fig. 2. In this figure it will be seen that the supply conduit 2 is provided with a restricted flow aperture 7 through which liquid in the conduit is required to pass in order to reach the treating tank. It is obvious that this restricted flow aperture will result in the production of two hydrostatic pressures, one between it and the source of liquid supply, and the other between it and the point of discharge, and that due to the ratio of pressure to velocity, the difference between these two hydrostatic pressures will vary in definite proportion to the velocity of flow in the conduit. For purpose of convenience I shall designate the hydrostatic pressure between the source and the flow aperture as the "primary pressure" and the pressure at the flow aperture or between it and the discharge, as the "secondary pressure." The numeral 8 designates a pressure responsive device in the nature of a flexible diaphragm enclosed in a casing 9. A tube 10 which taps the conduit between the flow aperture and the source has communication with this casing at one side of the diaphragm so that the primary pressure is transmitted to the diaphragm and tends to move it in one direction. A tube 11 which taps the conduit in the flow aperture or at the other side thereof has communication with the casing 9 at the other side of the diaphragm so that the secondary hydrostatic pressure may be impressed upon the side of the diaphragm opposite to that upon which the primary pressure is impressed. The arrangement provides a detecting device which is responsive to variations in the quantity of flow in conduit 2. The diaphragm has mechanical connection with the valve 12 housed in a valve casing 14, which valve and casing control the admission of liquid to the regulating receptacle 15. The arrangement is such that the primary pressure tends to open the valve, and due to the fact that this pressure is different from that on the discharge side of the flow aperture, the pressure responsive device will be subjected to an unbalanced pressure tending to hold the valve 12 open. Within the regulating receptacle 15 is an equalizing device in the nature of a float 16, the buoyant effect of which is dependent upon the level of liquid within the receptacle. This float is counterbalanced by suitable means 16ª and is mechanically connected with the valve 12, so that increase in its buoyancy tends to close that valve against the primary hydrostatic pressure. It will be obvious that the height of liquid within the regulating receptacle requisite to close the valve is dependent upon the balancing differential of the pressures upon the diaphragm 8, and that an increase of the primary pressure relative to the secondary pressure will necessitate a higher level of liquid within the regulating receptacle in order to close the valve. Inasmuch as the differential between the primary and secondary pressures is directly proportional to the flow in the supply conduit 2, the level of the liquid in the regulating receptacle will be proportional to, or some desired function of, the quantity of liquid flowing in said conduit. The proportionate relationship of the level created in the receptacle 15 to the primary pressure is predetermined by the shape of the equalizing float 16. The float can be of any shape desired, so that the submergence necessary to counterbalance the differential of pressure on the diaphragm incident to the velocity of flow in the supply conduit, may be made to vary in any desired manner. This is diagrammatically represented in Fig. 2 by the float of paraboloid or non-uniform elevational contour.

The level in the regulating receptacle 15 establishes the liquid level in an associated working receptacle 17, the two receptacles being connected by a pipe 18 for flow of liquid from the former into the latter. The working receptacle 17 is provided with an open discharge orifice 19, permitting continuous discharge of liquid from the two receptacles and creating a tendency in the regulating device to hold the inlet valve slightly open and establish a balance of flow. The liquid level in the working receptacle 17 determines the vertical position of the working float 20, which float has mechanical connection by means 21 with the measuring device 6 which controls the feed of treating material to the treating tank. The measuring means is illustrated as a gate or slide designed to vary the effective discharge area of a V notch through which the chemical flows to the treating tank, the flow area of said notch being increased as the working float rises. It is obvious that the division of the apparatus into separate receptacles for the equalizing float and the work float is not essential, but may be a matter of convenience as when it is desirable to separate the detecting and the regulating apparatus by some distance.

In the operation of the device, an increase in the flow in the supply conduit causes an increase in the differential between the primary and secondary pressures, which increased differential is effective upon the diaphragm 8 to open the valve 12 and admit liquid to the regulating receptacle 15 to the point where the differential is equalized by the resulting increase in buoyancy of the regulating float. This increase of liquid in the regulating receptacle raises the level of liquid in the working receptacle, which exercises the desired regulating effect upon the measuring means. The ratio of the change exercised upon the regulated mechanism to the change in flow in the supply conduit is determined by the form of the regulating or equalizing float, and may be a constant or arithmetical proportion, a geometrical proportion, or a variable proportion. Thus any desired change in the operation of the regulated mechanism is attained automatically from, and in predetermined relationship to, any change in the quantity of flow in the supply conduit.

In Fig. 3 is diagrammatically illustrated an alternative arrangement wherein the hydrostatic pressure over a weir 22 is rendered effective upon the pressure responsive device 8 to induce opening of the valve 12 for admission of liquid into the regulating receptacle, said pressure being exerted in opposition to a constant pressure exerted by means 13, which pressure represents the constant head of the liquid in the weir box below the weir. In this embodiment the equalizing float 16 has mechanical connection with an outlet valve 24 for regulating the discharge orifice. The valve 24 is closed when the liquid level in the regulating receptacle reaches a predetermined minimum, with the result that the effectiveness of the regulated mechanism may not be reduced below a predetermined minimum. It is obvious that the regulation by the single hydrostatic pressure as illustrated in this diagram may be utilized without the outlet control valve, or that the latter may be utilized in conjunction with the differential pressure regulation illustrated in Fig. 2.

In Fig. 4 I have shown an arrangement wherein the inlet valve 12 and outlet valve 24 are operated by solenoids, the energization of which is controlled by the position of the regulating float 16, and therefore is responsive to variations in the quantity of flow in the supply conduit.

In Fig. 5 I have illustrated an arrangement wherein there is maintained a continuous supply of liquid to the working and regulating receptacles through the supply pipe 25, the discharge from said receptacles through the aperture 26 being controlled by the position of the regulating float 16 and responsive to variations in the differential of the pressures effective upon the pressure regulating device 8. In this arrangement increase in the flow in the supply conduit is effective to decrease discharge from the regulating and working receptacles, hence permitting the liquid level in them to rise, and produce the desired effect upon the regulated mechanism. One advantage possessed by an arrangement of apparatus wherein the discharge from the regulating or operating receptacles is controlled to establish the level of the regulating liquid, is the circumstance that apparatus of such form may be operated with a smaller quantity of regulating fluid than in instances where there is a constant or continuous discharge of such liquid from the regulating or operating receptacles.

From the foregoing it will be observed that my improved apparatus in operation will effect an immediate response to any increase in the flow, and that when the proper adjustment has been effected to accommodate the new condition, the adjusting or accommodating operation is immediately discontinued. For example, when the proper liquid level in the regulating receptacle 15 and operating receptacle 17 is reached, the valve 12 will be closed, so that there will be no over-regulation and no hunting of the apparatus. Likewise any decrease in the primary flow is immediately met by the apparatus, due to the fact that the regulating valve 12 is always in delicate balance due to the continuous discharge. Decrease in flow in the supply conduit will result in the immediate closing of the valve 12, resulting in the immediate drop of the liquid level in the regulating and operating receptacles to the proper point to restore the balance. As a result, the apparatus will hold the regulated operation in close and sensitive conformity with the flow in the supply conduit.

I claim:

1. In apparatus of the class described, the combination of detecting means responsive to variations in flow of liquid in a conduit, means controlled thereby for establishing a hydrostatic level, an equalizing float variably effective upon said means in response to variations in said hydrostatic level, said equalizing float being arranged to vary the effectiveness of said means in a predetermined ratio.

2. In apparatus of the class described, the combination of a receptacle for liquid, means for supplying liquid to the receptacle, a valve for influencing the level of liquid in the receptacle, detecting means responsive to variations in flow in a conduit, said detecting means being effective to position said valve, a float of parabolic contour arranged to be positioned by liquid in the receptacle, said float being effective to position the valve, and operated means having its efficacy determined by the level of liquid in the receptacle.

3. In regulating apparatus of the class described, the combination of a receptacle for liquid, means for supplying liquid continuously in the said receptacle, flow-control means for controlling rate of discharge of liquid from said receptacle, detecting means and equalizing means both effective to position said flow-control means, said detecting means being responsive to variations in flow in a conduit and said equalizing means being responsive to variations in the level of liquid in said receptacle, and operated mechanism responsive to variations in the level of liquid in said receptacle.

4. Regulating apparatus comprising the combination with delivery means, of a receptacle, a float operable therein, a valve operable by said float for controlling supply of liquid to the receptacle, a pressure responsive device effective upon the valve, means for conducting liquid from a supply source to said pressure responsive device and to said receptacle in quantity determined by the position of said valve, and means responsive to variation in the level of liquid in the receptacle for regulating the delivery means.

5. In apparatus of the class described, the combination with delivery means, of a receptacle, a float operable therein, a valve under control of the said float for regulating admission of liquid to said receptacle, a pressure responsive device cooperating with said float to determine the position of said valve, means for impressing hydrostatic pressure from the supply source upon said pressure responsive device in relationship tending to open the valve and admit liquid under said pressure to the receptacle, and means variably effective in accordance with the level of liquid in said receptacle, for varying operation of the delivery means.

6. Feed regulating mechanism comprising, in combination, a working receptacle, a working float operable therein, a regulating receptacle hydraulically connected with the working receptacle so that the level of liquid in the two will equalize, a regulating float in the regulating receptacle, a valve operable by said regulating float for controlling the quantity of liquid in said receptacles, a pressure responsive device cooperating with said regulating float to control position of said valve, means for impressing hydrostatic pressure from a supply source upon said pressure responsive device, said hydrostatic pressure being effective to vary the liquid level in said receptacles.

7. The combination with a variable source of liquid supply, of a receptacle, a valve for controlling supply of liquid from said source to said receptacle, a pressure responsive device effective upon said valve, means for impressing hydrostatic pressure from said source upon said pressure device, a float responsive to variation in level of liquid in said receptacle and cooperating with said pressure responsive device to determine the position of the valve and delivery mechanism variable upon variation in liquid level in said receptacle.

In testimony whereof I have hereunto subscribed my name.

MILTON F. STEIN.